May 2, 1933.  B. PURCELL  1,906,811

DEFLECTOR FOR COTTON GINS

Filed Nov. 6, 1930

Inventor
Biship Purcell.
By Jesse R. Stone
& Lester B. Clark
Attorneys

UNITED STATES PATENT OFFICE

BISHIP PURCELL, OF HOUSTON, TEXAS

DEFLECTOR FOR COTTON GINS

Application filed November 6, 1930. Serial No. 493,732.

My invention relates to cotton gins and pertains particularly to a deflector to be used in connection with the gin saw to keep the motes and other impurities thrown off of the gin saw from being drawn back into the lint.

In the operation of cotton gins, and particularly cotton gins employing an air blast device for removing the lint from the gin saws, difficulty ordinarily arises from the ginning of cotton having motes and chaff therein, due to the fact that the motes and chaff thrown off by the saw are drawn back in with the lint by the suction created by the air blast. The motes are thus mixed with the lint and impurities mixed with the cotton serve to produce an inferior grade of cotton which sells at a price lower than it otherwise would if the motes and chaff could be eliminated.

It is an object of my invention to provide, adjacent to the blast nozzle, and above the same, a deflector which prevents the motes, chaff, etc., which are thrown off by the gin saw from being again drawn back and mixed with the lint.

Another object of the invention is to provide a mote deflector which is adjustable concentrically of the saws to vary the size of the moting field.

It is also an object to provide a deflector of this character which may be adjusted relative to the gin saw for use with saws rotating at various rates of speed in order to adjust the moting field in proportion to the speed of rotation of the saws.

I contemplate providing a deflector or guard which may be attached to the ordinary type of cotton gin with no change or alteration in the gin itself and serve to prevent the impurities which have been cast out from being again drawn in with the lint.

In the drawing herewith, Fig. 1 is a central vertical section through a cotton gin of the ordinary type of construction with my invention attached thereto.

Figure 1:
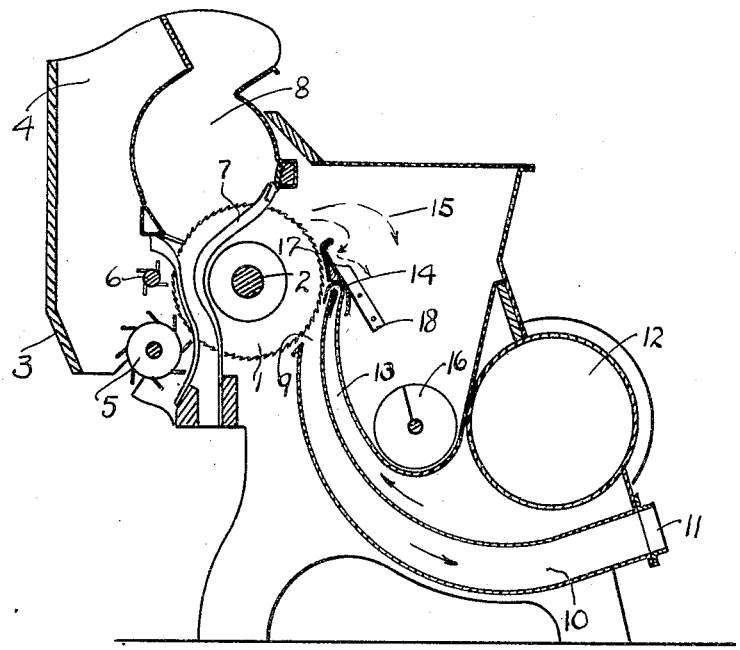

I employ my invention in connection with a cotton gin in which a blast device is employed for removing the cotton from the gin saws. Fig. 1 shows a gin cylinder 1 having saws thereon in the usual manner, said cylinder being mounted upon a shaft 2, supported rotatably at its ends within the housing 3 of the gin. The cotton is fed to the housing through an inlet opening or hopper 4 and is carried against the forward side of the gin saws 1 by means of rolls or conveyors 5 and 6. The gin saws operate through ribs or bars 7 of the usual construction supported at their ends in cross members supported in the housing. Above the ribs 7 is a chamber or roll box 8 to accommodate the cotton roll which forms above the saws in the operation of the gin. It should be noted that the roll box is located above and slightly to the front of the saw roll so that the free fall of seed will be permitted when they are freed from the lint.

The cotton is carried around by the saws through the ribs which serve to strip the seed therefrom and is carried to the rear where the lint is removed from the saws by a blast nozzle, 9, which is connected with a blast fan which doffs the lint from the saws and carries it to a chute 10 and discharges it through an outlet 11 to a conveyor or other means of removing the lint from the gin. The gin has an air chamber 12 above the cotton chute 10 and air is forced upwardly through a passage 13 to be discharged through a nozzle 14 immediately above the blast nozzle.

The motes which are thrown off from the gin follow a path such as is indicated by the arrows 15 in Fig. 1. They fall, together with the chaff, to the lower part of the housing where they are carried away by the conveyor 16. The nozzle 14 is so formed that the air in passing to the nozzle 9 is directed downwardly to contact the saw roll and doff the cotton therefrom so that the lint will be carried into the chute 10. The air blast structure including the nozzles 9 and 14 is located to the rear of the saw roll and slightly below the center thereof. This position is shown in the drawing and causes the air to strike the saw roll at a point after the motes have been thrown off by centrifugal force and after these motes and trash have passed through the gin ribs 7.

It is found in operation of the gin that the motes and other chaff of comparatively light weight are sometimes drawn back toward the saws by the suction induced by the blast nozzle 9. In other words the suction at 9 affects the neutral air present in the moting chamber and causes such a circulation that some of the particles of trash and motes being flung from the saw are carried back toward the saw and drawn in through the nozzle 9 into the chute 10 where they tend to contaminate ginned lint. To avoid this I provide a deflector adjacent the saws which serves as a baffle to cut off the the suction induced by the blast nozzle and which acts also to deflect any returning motes or other particles away from the gin saws and from the suction nozzle. This deflector comprises a plate of sheet metal or similar construction shown at 17. This plate is secured at its ends to cleats 18, which are supported upon the walls of the housing and attached thereto by means of bolts extending through openings 18' or by any other convenient means. In some types of gins the mote board is movable toward and away from the saw roll in a manner such as disclosed in the patent to Garner 1,520,412, and it is contemplated that the present invention may be used on a mote board which is so mounted. As will be seen from Fig. 1, the plate is set at an angle supported upon the upper end of the nozzle 14. The lower end of the deflector plate is rounded in toward the blast nozzle, as shown at 19. The upper end is recurved and bent back to provide a wall 20, which is adapted to conform approximately to the curvature of the gin saws and to lie in a position spaced slightly from said saws but concentric with the surface thereof.

To make this deflector extensible so as to be moved upwardly a greater distance from the nozzle 14, I have placed an extension 21 thereon which is formed of a plate of sheet metal conforming in curvature to the plate 20, being bent outwardly at 22 away from the saws to form a flange which provides a recess 23 on its outer side to receive the motes and deflect them out of the air current and away from the saws. This extension fits over the deflector plate 20 and is adjustable thereon by means of bolts 24, fitting within longitudinal slots 25 in the extension.

Figures 2, 3:
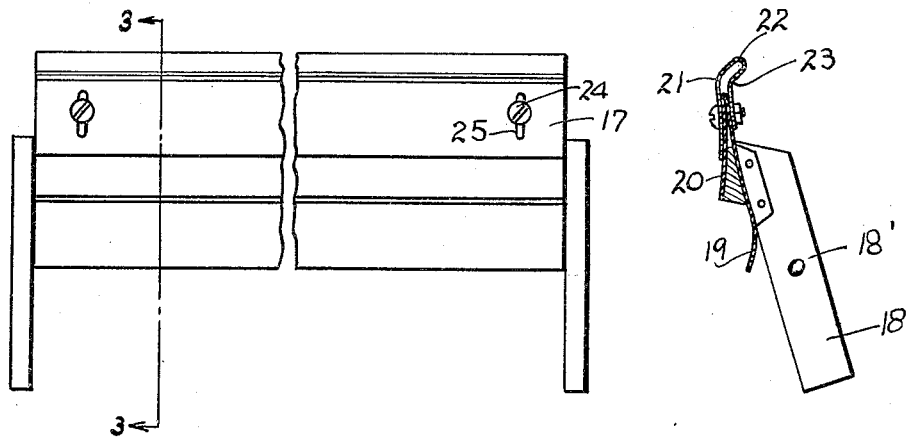
Fig. 2 is a front elevation of the deflector.
Fig. 3 is a transverse section on the plane 3—3 of Fig. 2.

It will readily be seen from Fig. 3 that the width of the deflector may be varied within limits so as to allow the upper edge of the deflector to be moved at varying distances from the upper part of the blast nozzle.

In the use of my device the motes drawn through the ribs 7 with the lint will be thrown off from the upper periphery of the saws as shown by the arrows. These motes and such chaff as may be thrown off with them tend to be drawn back by a suction created by the blast nozzle and will engage with the outer face of the flange on the deflector plate. Due to the recurving of the upper edge of the deflector the motes will engage in the recess 23 against the outer face of the plate and will pass downwardly out of the influence of any suction which might be created by force of air from the blast nozzle and will be engaged by the conveyor 16 and carried from the housing. In this way large amounts of impurities which would otherwise be drawn back with the lint and tend to depreciate the value of the cotton from the gin will be carried away and eliminated.

It is desirable in the use of my deflector to place it closely adjacent the outer periphery of the gin saws and as far up on the saw as may be necessary to deflect away the motes and chaff. With different characters of cotton which are ginned it is desirable to drive the saw roll at different speeds so that proper ginning will be accomplished. Thus, if the saw roll rotates slowly the motes will be thrown off at a lower elevation than otherwise. If the saw is operating at a high rate of speed and the blast from the nozzle is also appreciably high, the upper edge of the deflector must be moved upwardly so as to restrict the moting field in proportion to the centrifugal force of the saws. The adjustable feature on my deflector enables me to do this and I am able to adjust the width of the deflector to suit conditions under which the gin is operated. If the moting board is too low there remains an area between the top thereof and the elevation at which the motes are being discharged, which area is open for the return of motes and trash, but with my improved board adjustment concentrically or circumferentially of the saw may be made to restrict the moting field in proportion to the speed of rotation of the saws. When the moting field is properly restricted then there are little or no follow currents set up in the moting chamber and the lint is delivered in the cleanest possible condition. The adjustable moting board thus assists in controlling the air currents in the moting chamber and also deflects any particles which tend to return to the lint.

In connection with the flange 22 on the deflector plate, it should be noted that any air currents set up in the moting chamber due to the rotation of the saws will tend to cause currents of air to return against the surface of the saws. The motes and other trash being thrown from the saw will naturally set up a circular motion of the air in the moting chamber. With a view of discouraging any circulation of air in the moting chamber the flange 22 has been formed on the deflector board and the recess 23 forms a dead air space directly behind the deflector so that any particles of trash approaching the saws at this elevation will enter this dead space and be permitted to fall by the force of gravity instead of being returned against the surface of the saw. The advantages of this construction will be apparent to those skilled in the art.

What I claim as new is:

1. In a cotton gin including a housing, a saw cylinder rotatable therein, and an air blast nozzle adjacent said saw cylinder to remove the lint therefrom; the combination of a mote deflecting plate secured to the sides of said housing above said nozzle and spaced close to said cylinder to deflect motes and the like from said nozzle, said plate having an upper edge curved away from said cylinder to engage said motes.

2. In a cotton gin including a housing, a saw cylinder rotatable therein and an air blast nozzle adjacent the lower side of said cylinder, the combination of a deflector plate of sheet metal secured to said housing and fitting about the discharge end of said nozzle, the upper edge of said plate being positioned close to said saw cylinder, an upper edge on said plate inclined away from said cylinder to form a recess to receive motes and prevent their return to said cylinder and deflect them downwardly in the manner described.

3. In a cotton gin including a housing, a saw cylinder rotatable therein and an air blast nozzle adjacent the lower side of said cylinder, the combination of a deflector plate secured to said housing and fitting about the upper end of said nozzle, the upper edge of said plate being positioned close to said saw cylinder, and an extension fitting over the upper edge of said plate and adjustable longitudinally thereon approximately tangentially along said cylinder, said extension having its upper portion bent away from said cylinder.

4. A deflector for cotton gins including a plate adapted to extend along the rearward side of the saw cylinder of the gin, said plate being curved to lie close to said cylinder, and means whereby said plate can be extended to vary the amount of the surface of said cylinder covered by said plate.

5. In a cotton gin, a saw roll, a moting board positioned adjacent said roll, a surface on said board concentric with said saw roll, and means to adjust said surface circumferentially of said saw roll to vary the size of the moting field.

6. In combination with a cotton gin saw roll, a mote board to define the moting field, a flange forming part of said board, and means to adjust said flange to vary the width of the moting field.

7. In combination with a cotton gin saw roll, a mote board to define the moting field, a flange thereon, and means to adjust said flange to vary the width of the moting field when said saw roll is rotated at different speeds.

8. In a cotton gin a housing, a saw roll, a moting chamber, an entrance to said chamber for the motes and trash to be thrown from the circumference of said roll into said chamber, and means to vary the circumference of said saw roll exposed at said entrance.

9. In a cotton gin a housing, a saw roll, a moting chamber, an entrance to said chamber for the motes and trash to be thrown from said roll into said chamber, and means to vary the circumference of said saw roll exposed, said means including a mote board adjustable as to width.

10. In a cotton gin a housing, a saw roll, a moting chamber, an entrance to said chamber for the motes and trash to be thrown from said roll into said chamber, and means to vary the width of said chamber, said means including an extensible mote board.

11. A cotton gin adapted to accommodate cotton of different characters including a saw roll arranged to rotate at different speeds, a mote board positioned adjacent said saw roll, a flange on said board, and means to adjust said flange along the periphery of said saw roll to vary the moting field in accordance with the speed of rotation of said saw roll.

12. In a cotton gin having a saw roll, a mote board, a curved flange on said board to deflect air currents set up by the saw roll, said flange being curved away from the saw roll whereby a dead air space is formed.

13. In a cotton gin having a saw roll and a mote board, a flange on said board extending away from the saw roll, said flange forming with said board a dead air space whereby motes and trash entering such space will separate by the force of gravity.

14. In a cotton gin having a saw roll and a mote board, a flange on said board extending away from the saw roll, said flange forming with said board a dead air space whereby motes and trash entering such space will separate by the force of gravity, and means to adjust said flange with respect to said board to position such dead air space with respect to said saw roll.

In testimony whereof I hereunto affix my signature this 31st day of October, A. D. 1930.

BISHIP PURCELL.